US011042156B2

(12) United States Patent
Chen et al.

(10) Patent No.: US 11,042,156 B2
(45) Date of Patent: Jun. 22, 2021

(54) SYSTEM AND METHOD FOR LEARNING AND EXECUTING NATURALISTIC DRIVING BEHAVIOR

(71) Applicant: Honda Motor Co., Ltd., Tokyo (JP)

(72) Inventors: Yi-Ting Chen, Sunnyvale, CA (US); Teruhisa Misu, Mountain View, CA (US); Vasili Ramanishka, Boston, MA (US)

(73) Assignee: Honda Motor Co., Ltd., Tokyo (JP)

( * ) Notice: Subject to any disclaimer, the term of this patent is extended or adjusted under 35 U.S.C. 154(b) by 302 days.

(21) Appl. No.: 15/978,858

(22) Filed: May 14, 2018

(65) Prior Publication Data
US 2019/0346844 A1 Nov. 14, 2019

(51) Int. Cl.
G05D 1/00 (2006.01)
G05D 1/02 (2020.01)
G05B 13/02 (2006.01)

(52) U.S. Cl.
CPC ......... G05D 1/0088 (2013.01); G05B 13/027 (2013.01); G05D 1/024 (2013.01); G05D 1/0248 (2013.01); G05D 1/0274 (2013.01)

(58) Field of Classification Search
CPC .... G05D 1/0088; G05D 1/024; G05D 1/0248; G05D 1/0274; G05B 13/027; G05B 13/0265; B60W 50/00
See application file for complete search history.

(56) References Cited

U.S. PATENT DOCUMENTS

| 6,154,559 | A | * | 11/2000 | Beardsley | A61B 3/113 340/576 |
| 6,208,981 | B1 | * | 3/2001 | Graf | B60G 17/018 706/2 |
| 8,140,241 | B2 | | 3/2012 | Takeda et al. | |
| 9,327,735 | B2 | | 5/2016 | Bredberg et al. | |
| 9,476,729 | B2 | | 10/2016 | Goldman-Shenhar et al. | |
| 9,524,269 | B1 | | 12/2016 | Brinkmann et al. | |
| 9,527,384 | B2 | | 12/2016 | Bando et al. | |
| 9,535,878 | B1 | | 1/2017 | Brinkmann et al. | |
| 9,672,446 | B1 | * | 6/2017 | Vallespi-Gonzalez | H04N 13/239 |
| 9,731,727 | B2 | * | 8/2017 | Heim | B60W 40/09 |
| 10,169,678 | B1 | * | 1/2019 | Sachdeva | G06K 9/66 |
| 2006/0284839 | A1 | * | 12/2006 | Breed | B62D 1/046 345/156 |

(Continued)

Primary Examiner — Jeff A Burke
Assistant Examiner — Kyle T Johnson
(74) Attorney, Agent, or Firm — Rankin, Hill & Clark LLP

(57) ABSTRACT

A system and method for learning and executing naturalistic driving behavior that include classifying a driving maneuver as a goal-oriented action or a stimulus-driven action based on data associated with a trip of a vehicle. The system and method also include determining a cause associated with the driving maneuver classified as a stimulus-driven action and determining an attention capturing traffic related object associated with the driving maneuver. The system and method additionally include building a naturalistic driving behavior data set that includes at least one of: an annotation of the driving maneuver based on a classification of the driving maneuver, an annotation of the cause, and an annotation of the attention capturing traffic object. The system and method further include controlling the vehicle to be autonomously driven based on the naturalistic driving behavior data set.

14 Claims, 8 Drawing Sheets

(56) References Cited

U.S. PATENT DOCUMENTS

| | | | |
|---|---|---|---|
| 2010/0159434 A1* | 6/2010 | Lampotang | G09B 23/30 434/365 |
| 2012/0271484 A1* | 10/2012 | Feit | B60W 30/12 701/1 |
| 2013/0052614 A1 | 2/2013 | Mollicone et al. | |
| 2013/0307771 A1* | 11/2013 | Parker | G06F 3/0482 345/158 |
| 2014/0172467 A1* | 6/2014 | He | B60K 28/06 705/4 |
| 2014/0297059 A1* | 10/2014 | Mizutani | B60W 50/00 701/1 |
| 2015/0193664 A1* | 7/2015 | Marti | A61B 5/18 382/103 |
| 2015/0193885 A1 | 7/2015 | Akiva et al. | |
| 2017/0200061 A1 | 7/2017 | Julian et al. | |
| 2018/0032082 A1* | 2/2018 | Shalev-Shwartz | B60W 30/09 |
| 2018/0045519 A1* | 2/2018 | Ghadiok | G01C 21/30 |
| 2018/0105186 A1* | 4/2018 | Motomura | G08G 1/096775 |
| 2018/0319407 A1* | 11/2018 | Lisseman | G06K 9/00838 |
| 2019/0072966 A1* | 3/2019 | Zhang | G08G 1/166 |
| 2019/0212746 A1* | 7/2019 | Cheng | B60W 60/001 |
| 2019/0258251 A1* | 8/2019 | Ditty | G06K 9/00805 |
| 2019/0265712 A1* | 8/2019 | Satzoda | B60W 40/09 |
| 2019/0317510 A1* | 10/2019 | Ros Sanchez | G05D 1/0221 |
| 2019/0346844 A1* | 11/2019 | Chen | G05B 13/027 |
| 2020/0039520 A1* | 2/2020 | Misu | B60W 40/09 |
| 2020/0039521 A1* | 2/2020 | Misu | G05D 1/0088 |
| 2020/0114924 A1* | 4/2020 | Chen | B60W 50/0098 |
| 2020/0353943 A1* | 11/2020 | Siddiqui | G08G 5/0013 |

* cited by examiner

| GOAL-DRIVEN ACTION | # INSTANCES | AVG. DURATION |
|---|---|---|
| INTERSECTION PASSING | 3707 | 3.58 / 2.28 |
| LEFT TURN | 1098 | 6.15 / 3.28 |
| RIGHT TURN | 1072 | 5.99 / 3.16 |
| CROSSWALK PASSING | 613 | 1.06 / 1.53 |
| RIGHT LANE CHANGE | 324 | 3.84 / 1.98 |
| LEFT LANE CHANGE | 320 | 3.59 / 1.68 |
| LEFT LANE BRANCH | 172 | 3.03 / 1.31 |
| RAILROAD PASSING | 69 | 2.92 / 2.06 |
| RIGHT LANE BRANCH | 64 | 3.21 / 2.49 |
| MERGE | 66 | 4.06 / 2.95 |
| U-TURN | 62 | 8.89 / 4.20 |
| STIMULUS-DRIVEN ACTION | # INSTANCES | AVG. DURATION |
| STOP | 3329 | 4.33 / 2.02 |
| DEVIATE | 25 | 3.98 / 2.50 |
| CAUSE | # INSTANCES | AVG. DURATION |
| SIGN | 1604 | 4.20 / 2.18 |
| CONGESTION | 1196 | 4.36 / 1.88 |
| TRAFFIC LIGHT | 455 | 4.72 / 1.69 |
| PEDESTRIAN | 74 | 4.10 / 2.16 |
| PARKED CAR | 25 | 3.98 / 2.50 |
| ATTENTION | # INSTANCES | AVG. DURATION |
| CROSSING VEHICLE | 1008 | 9.52 / 13.01 |
| CROSSING PEDESTRIAN | 491 | 7.32 / 5.61 |
| RED LIGHT | 453 | 23.54 / 23.13 |
| CUT-IN | 241 | 3.65 / 1.90 |
| SIGN | 208 | 2.02 / 1.85 |
| ON-ROAD BICYCLIST | 171 | 3.32 / 3.16 |
| PARKED VEHICLE | 167 | 3.09 / 2.56 |
| MERGING VEHICLE | 161 | 3.16 / 2.34 |
| YELLOW LIGHT | 128 | 4.05 / 11.46 |
| ROAD WORK | 37 | 8.95 / 9.84 |
| PEDESTRIAN NEAR E GO LANE | 35 | 2.77 / 1.67 |

FIG. 2

SYSTEM AND METHOD FOR LEARNING AND EXECUTING NATURALISTIC DRIVING BEHAVIOR

BACKGROUND

Most autonomous driving systems take real time sensor data into account when providing autonomous driving functionality. The sensor data takes into account objects, roadways, and obstacles that may be faced by the vehicle during vehicle operation in real-time. However, these systems do not provide vehicle operation that takes a driver's logic, attentive behavior, and casual reactions into account when providing autonomous driving functionality. Consequently, such systems do not determine a complete driving scene which may limit how well a vehicle may be controlled to adapt scenarios within a dynamic driving environment.

BRIEF DESCRIPTION

According to one aspect, a computer-implemented method for learning and executing naturalistic driving behavior that includes classifying a driving maneuver as a goal-oriented action or a stimulus-driven action based on data associated with a trip of a vehicle. The computer-implemented method also includes determining a cause associated with the driving maneuver classified as a stimulus-driven action and determining an attention capturing traffic related object associated with the driving maneuver. The computer-implemented method additionally includes building a naturalistic driving behavior data set that includes at least one of: an annotation of the driving maneuver based on a classification of the driving maneuver, an annotation of the cause, and an annotation of the attention capturing traffic object. The computer-implemented method further includes controlling the vehicle to be autonomously driven based on the naturalistic driving behavior data set. Annotations included within the naturalistic driving behavior data set are utilized to control the vehicle to execute the naturalistic driving behavior.

According to another aspect, a system for learning and executing naturalistic driving behavior that includes a memory storing instructions when executed by a processor that cause the processor to classify a driving maneuver as a goal-oriented action or a stimulus-driven action based on data associated with a trip of a vehicle. The instructions also cause the processor to determine a cause associated with the driving maneuver classified as a stimulus-driven action and determine an attention capturing traffic related object associated with the driving maneuver. The instructions additionally cause the processor to build a naturalistic driving behavior data set that includes at least one of: an annotation of the driving maneuver based on a classification of the driving maneuver, an annotation of the cause, and an annotation of the attention capturing traffic object. The instructions further cause the processor to control the vehicle to be autonomously driven based on the naturalistic driving behavior data set. Annotations included within the naturalistic driving behavior data set are utilized to control the vehicle to execute the naturalistic driving behavior.

According to still another aspect, non-transitory computer readable storage medium storing instructions that when executed by a computer, which includes a processor perform a method that includes classifying a driving maneuver as a goal-oriented action or a stimulus-driven action based on data associated with a trip of a vehicle. The method also includes determining a cause associated with the driving maneuver classified as a stimulus-driven action and determining an attention capturing traffic related object associated with the driving maneuver. The method additionally includes building a naturalistic driving behavior data set that includes at least one of: an annotation of the driving maneuver based on a classification of the driving maneuver, an annotation of the cause, and an annotation of the attention capturing traffic object. The method further includes controlling the vehicle to be autonomously driven based on the naturalistic driving behavior data set, wherein annotations included within the naturalistic driving behavior data set are utilized to control the vehicle to execute naturalistic driving behavior.

BRIEF DESCRIPTION OF THE DRAWINGS

FIG. 2 is an illustrated example of a naturalistic driving behavior data set according to an exemplary embodiment of the present disclosure;

DETAILED DESCRIPTION

Figure 1:
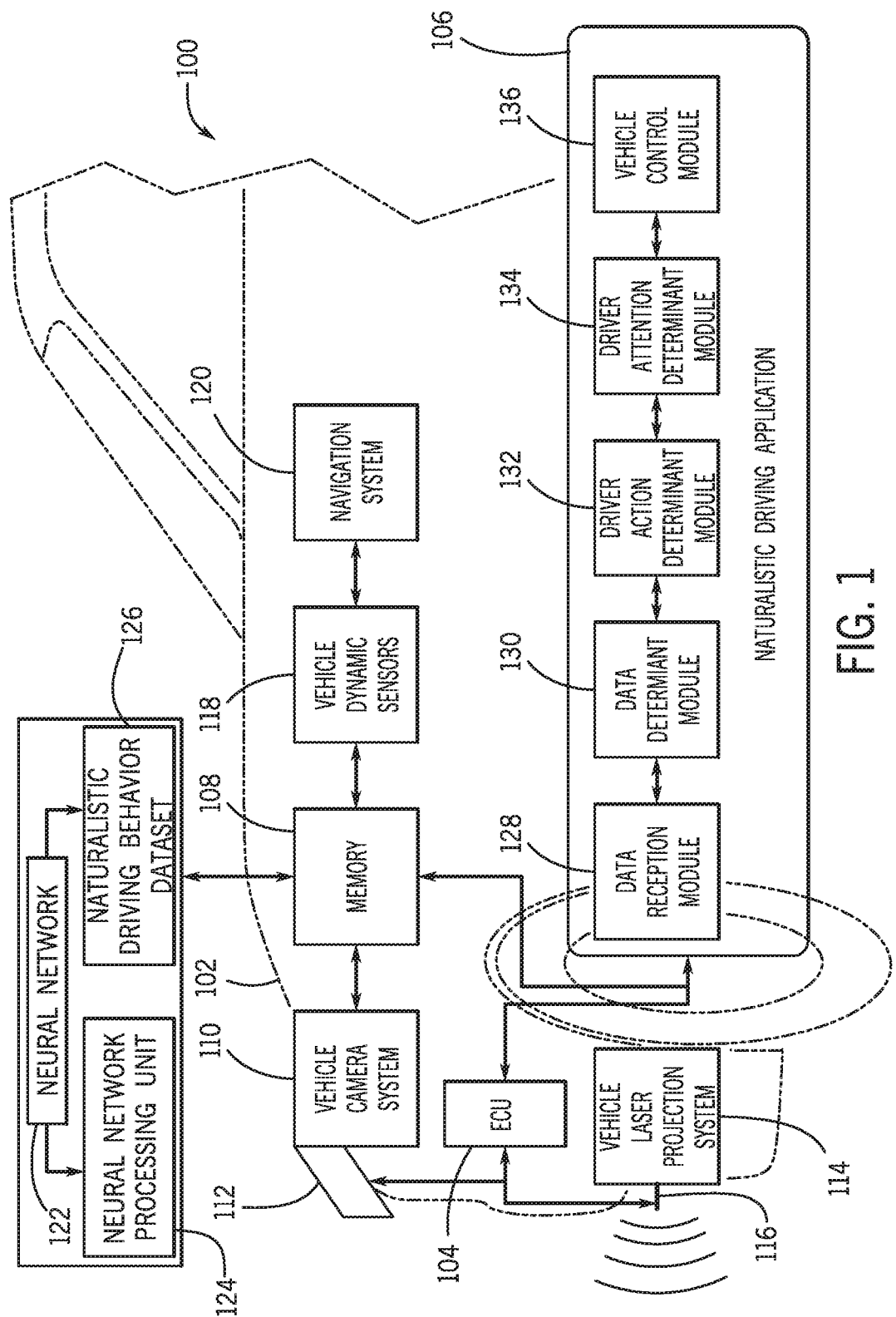
FIG. 1 is a schematic view of an exemplary operating environment for implementing systems and methods for learning and executing naturalistic driving behavior according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for learning and executing naturalistic driving behavior according to an exemplary embodiment. The components of the environment 100, as well as the components of other systems, hardware architectures, and software architectures discussed herein, can be combined, omitted, or organized into different architectures for various embodiments.

Generally, the environment 100 includes a vehicle 102 with an electronic control unit (ECU) 104 that executes one or more applications, operating systems, vehicle system and subsystem user interfaces, among others. The ECU 104 may also execute a naturalistic driving application 106 that may be configured to understand driver behaviors associated with a driver (not shown) driving the vehicle 102 in various traffic scenes. The application 106 may utilize a neural network 122 with machine learning and deep learning to provide artificial intelligence capabilities that maybe utilized to build and maintain a naturalistic driving behavior data set 126 with annotations associated with a four layer annotation scheme and related data associated with the four layer annotation scheme. The application 106 may process information from various sources provided as inputs and may utilize the neural network 122 to provide various functions, that may include, but may not be limited to computer vision, object classification, feature recognition, multilayer perceptions, and autonomous driving commands.

As discussed in more detail below, the naturalistic driving application 106 may utilize the four layer annotation scheme during one or more periods of times that may constitute one or more respective trips of the vehicle 102. The one or more trips of the vehicle 102 may include operation and travel of the vehicle 102 that may be conducted in various locations and to various destinations during one or more periods of time. The four layer annotation scheme may be utilized to include classes of driving processes that include, but may not be limited to, an operational process that corresponds to the manipulation of the vehicle 102, a tactical process that include interactions between the vehicle, traffic participants, and the surrounding environment of the vehicle 102, and a strategic process for higher level reasoning, planning, and decision making.

In an exemplary embodiment, the four layer annotation scheme may include the categorization of one or more driving maneuvers as a goal-oriented action that may include the driver's manipulation(s) of the vehicle 102 in a navigation task (e.g., right turn) that may be based on a driver's possible intent to conduct the driving maneuver(s). The four layer annotation scheme may include the categorization of one or more driving maneuvers as a stimulus-driven action (e.g., stopping the vehicle 102) that may be indicative of a reason (due to a driver's reaction to) or one or more external stimuli to conduct the driving maneuver(s). The four layer annotation scheme may also include a determination of causal reasoning of the one or more driving maneuvers classified as stimulus-driven actions to explain the reasoning for the driver's actions when conducting the one or more driving maneuvers (e.g., a stopped car in front of the vehicle 102 is an immediate cause for stopping the vehicle 102). Additionally, the four layer annotation scheme may include the determination of driver actions associated with one or more attention capturing traffic related objects that may be attended to by the driver as the driver conducts the one or more driving maneuvers (e.g., a pedestrian that may be attended by the driver of the vehicle 102 since the pedestrian might perform certain action that would affect the driver's behavior).

The four layer annotation scheme may be based on one or more sources of data associated with the operation of the vehicle 102, the internal environment of the vehicle 102, and/or the surrounding (external) environment of the vehicle 102. The application 106 may additionally add related data associated with the four layer annotation scheme for each trip of the vehicle 102 to the naturalistic driving behavior data set 126 to be further utilized to control the vehicle 102 to be autonomously driven to provide natural driving behaviors in various traffic scenes.

The four layer annotation scheme may be utilized to detect driver behaviors which occur during driving sessions by predicting a probability of distribution over a list of predefined behavior classes at one or more points of time. In other words, the application 106 provides a complete driving scene understanding by associating the interactions between human driver behaviors and corresponding traffic scene situations. In one or more configurations, the complete driving scene understanding may enable the application 106 to provide one or more commands to autonomously control the vehicle 102 to be driven in a manner that accounts for classifications (e.g., types) of driving maneuvers, the driver's casual reasoning when conducting specific types of driving maneuvers, and the driver's attention to one or more traffic related objects that may influence driving behaviors when conducting the one or more driving maneuvers.

With continued reference to FIG. 1, the vehicle 102 may include a plurality of components, for example, a memory 108, a vehicle camera system 110 that is operably connected to one or more cameras 112, a vehicle light detection and ranging system, (vehicle laser projection system) 114 that is operably connected to one or more LiDAR transceivers 116, a plurality of vehicle dynamic sensors 118, and a navigation system 120.

The ECU 104 and each of the plurality of components of the vehicle 102 discussed above that are operably connected to the ECU 104, will now be discussed in more detail. In an exemplary embodiment, the ECU 104 may be configured to operably control the plurality of components of the vehicle 102. The ECU 104 may additionally provide one or more commands to one or more control units (not shown) of the vehicle 102, including, but not limited to an engine control unit, a braking control unit, a transmission control unit, a steering control unit, and the like to control the vehicle 102 to be autonomously driven. The autonomous control of the vehicle 102 may be provided to partially control driving of the vehicle 102 during one or more circumstances (e.g., safety controls, driver assist controls), and/or fully to control driving of the vehicle 102 during an entire trip of the vehicle 102. As discussed, the naturalistic driving application 106 may communicate with the ECU 104 to control the vehicle 102 to be autonomously driven in one or more traffic scenes based on the naturalistic driving behavior data set 126.

In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the vehicle 102. The ECU 104 may also include a communication device (not shown) for sending data internally in the vehicle 102 and communicating with externally hosted computing systems (e.g., external to the vehicle 102). Generally, the ECU 104 communicates with the memory 108 to execute the one or more applications, operating systems, vehicle systems and subsystem user interfaces, and the like that are stored within the memory 108.

The memory 108 may be configured to store one or more executable files associated with one or more operating systems, applications, associated operating system data, application data, vehicle system and subsystem user interface data, and the like that are executed by the ECU 104. In one or more embodiments, the memory 108 of the vehicle 102 may be accessed by the naturalistic driving application 106 to store data, for example, one or more images, videos, one or more sets of image coordinates, one or more sets of object coordinates (e.g., LiDAR coordinates associated with the position of an object), one or more sets of locational coordinates (e.g., GPS/DGPS coordinates) and/or vehicle dynamic data associated with the vehicle 102.

In some embodiments, the memory 108 may include one or more traffic related object models (not shown) associated with one or more traffic related objects that represent values that include a range of sizes and features (within an image) that are associated to different types of traffic related objects. The memory 108 may also store a preprogrammed LiDAR coordinates map (not shown) that may include one or more sets of image coordinates (e.g., two dimensional image coordinates) that correspond to one or more sets of object coordinates (e.g., three dimensional object coordinates). Additionally, the memory 108 may store a preprogrammed driver coordinates map that may include one or more sets of image coordinates (e.g., three dimensional image coordinates) that correspond to one or more directions of eye gaze and one or more angles of head movement of the driver of the vehicle 102.

In an exemplary embodiment, the memory 108 may include the neural network 122. The neural network 122 may process a programming model which enables computer/machine based/deep learning that may be centered on one or more forms of data that are provided to the neural network 122. In addition to being hosted on the memory 108, in some embodiments, the neural network 122, subsets of the neural network 122, and/or subsets of data may be used by the neural network 122 may be hosted on an externally hosted server infrastructure (not shown) that may be configured to communicate with the ECU 104 of the vehicle 102 through the communication device of the ECU 104.

In one or more embodiments, the neural network 122 may include a neural network processing unit 124 that may be configured to utilize machine learning/deep learning to provide artificial intelligence capabilities that may be utilized to build and maintain the naturalistic driving behavior data set 126 with the four layer annotations scheme. The neural network processing unit 124 may process information that is provided as inputs and may utilize the naturalistic driving behavior data set 126 to access stored computer/machine learned annotations and associated data to provide various functions, that may include, but may not be limited to, object classification, feature recognition, computer vision, speed recognition, machine translation, autonomous driving commands, and the like.

In one embodiments, the neural network 122 may be configured as a convolutional neural network (CNN) that may be configured to receive inputs in the form of image data of video streams and may flatten the data and concatenate the data with sensor features provided by the vehicle dynamic sensors 118. The CNN may evaluate raw image pixels and may label class scores and may thereafter concatenate the class scores with sensor features to build and maintain the naturalistic driving behavior data set 126 with the four layer annotations scheme. In additional configurations, the system may utilize additional classification schemes or systems utilized to build and maintain the naturalistic driving behavior data set 126 with the four layer annotations scheme, that may include, but may not be limited to, support vector machines, logic-centric production systems, Bayesian belief networks, fuzzy logic models, data fusion engines, decision trees, probabilistic classification models and the like.

FIG. 2 is an illustrated example of the naturalistic driving behavior data set 200 according to an exemplary embodiment of the present disclosure. In one or more embodiments, the naturalistic driving application 106 may communicate with the neural network processing unit 124 of the neural network 122 to access the naturalistic driving behavior data set 200 to store one or more annotations associated with the four layer annotation data scheme. As shown in the illustrative example of FIG. 2, the naturalistic driving behavior data set 200 may include annotations associated with the driving maneuvers (e.g., driving actions/driving behaviors) that may be classified in real-time by the application 106 as the goal-oriented actions 202 and the stimulus-driven actions 204.

The data set 200 may additionally include annotations that are determined as a cause 206 that is associated with driving maneuvers that are classified as stimulus-driven actions 204. Additionally, the data set 200 may include annotations that are determined as attention capturing traffic related object(s) (shown as attention) 208 that may include one or more traffic related objects that may capture the attention of the driver as the driver conducts the one or more driving maneuvers during each trip of the vehicle 102. As discussed, the annotations and related data may be determined in real-time during each trip of the vehicle 102 and added to the naturalistic driving behavior data set 126 to be utilized to autonomously control the vehicle 102 during the respective trip of the vehicle 102 and subsequent trips of the vehicle 102.

As discussed below, the naturalistic driving application 106 may utilize image data, LiDAR data, and vehicle dynamic data that is used to classify the one or more driving maneuvers conducted by the driver as the goal-oriented action 202 or the stimulus-driven action 204 to add underlying annotations and related data to the naturalistic driving behavior data set 200 (e.g., to train the neural network 122). Additionally, such data may be utilized by the application 106 to determine the cause 206 associated with the one or more driving maneuvers classified as stimulus-driven actions. The application 106 may thereby add respective annotations and related data attributed to the cause 206 to the naturalistic driving behavior data set 200. Image data and LiDAR data may also be used to determine the one or more attention capturing traffic related objects 208 associated with the one or more driving maneuvers that may influence driving behaviors of the driver when conducting the one or more driving maneuvers. Accordingly, respective annotations and related data may be added to the naturalistic driving behavior data set 200 that are attributed to the attention capturing traffic related objects 208.

Referring again to FIG. 1, the vehicle camera system 110 may include one or more cameras 112 that are positioned at one or more exterior and interior portions of the vehicle 102. The camera(s) 112 may be positioned in a direction to capture the surrounding environment of the vehicle 102. In an exemplary embodiment, the surrounding environment of the vehicle 102 may be defined as a predetermined area located in around (front/sides/behind) the vehicle 102 (e.g., road environment in front, sides, and/or behind of the vehicle 102) that may be included within the vehicle's travel path. The one or more cameras 112 of the vehicle camera system 110 may be disposed at external front and/or side portions of the vehicle 102, including, but not limited to different portions of the vehicle bumper, vehicle front lighting units, vehicle fenders, and the windshield. The one or more cameras may be positioned on a planar sweep pedestal (not shown) that allows the one or more cameras to be oscillated to capture images of the external environment of the vehicle 102 at various angles.

Additionally, the one or more cameras 112 of the vehicle camera system 110 may be disposed at internal portions of the vehicle 102 including the vehicle dashboard (e.g., dash mounted camera), rear side of a vehicle rear view mirror, etc. The camera(s) 112 may also be positioned in a direction of the driver of the vehicle 102 to capture images of the driver as the vehicle 102 is being driven. The camera(s) may be calibrated to clearly capture specific body movements that may include head angle of the driver as the driver moves their head towards one or more traffic related objects while conducting the one or more driving maneuvers. Additionally, the camera(s) may be calibrated to clearly capture eye gaze movements as the driver moves their eyes to view one or more traffic related objects while conducting the one or more driving maneuvers.

The one or more cameras 112 may provide untrimmed images/video of the surrounding environment of the vehicle 102 and the internal portions of the vehicle 102. As discussed below, the naturalistic driving application 106 may execute image logic to determine the image data. The application 106 may additionally execute the image logic to determine one or more sets of image coordinates associated with one or more objects that may include, but may not be limited to, traffic participants (e.g., pedestrians, bikers, other vehicles), roadway attributes (e.g., lane markings, off-ramps, curbs), and road side objects (e.g., traffic light, stop sign). The naturalistic driving application 106 may additionally execute the image logic to determine driver eye gaze coordinates and driver head angle coordinates that may be utilized by the application 106 to determine the one or more attention capturing traffic related objects that may capture the driver's attention as they conduct the one or more driving maneuvers.

As stated above, the vehicle laser projection system 114 of the vehicle 102 may include one or more laser projection transceivers that may include but are not limited to one or more LiDAR transceivers 116. The one or more LiDAR transceivers 116 of the vehicle laser projection system 114 may be disposed at external front and/or side portions of the vehicle 102, including, but not limited to different portions of the vehicle bumper, vehicle front lighting units, vehicle fenders, and the windshield. Additionally or alternatively, the one or more LiDAR transceivers 116 of the vehicle laser projection system 114 may be disposed at internal positions of the vehicle 102 including the vehicle dashboard (e.g., dash mounted camera), rear side of a vehicle rear view mirror, etc.

The one or more LiDAR transceivers 116 may include one or more planar sweep lasers that include respective three-dimensional LiDAR sensors that may be configured to oscillate and emit one or more laser beams of ultraviolet, visible, or near infrared light toward the surrounding environment of the vehicle 102. The one or more LiDAR transceivers 116 may be configured to receive one or more reflected laser waves (e.g., signals) that are reflected off one or more objects included within the surrounding environment of the vehicle 102. In other words, upon transmitting the one or more laser beams to the surrounding environment of the vehicle 102, the one or more laser beams may be reflected as laser waves by one or more traffic related objects (e.g., motor vehicles, pedestrians, trees, guardrails, etc.) that are located within the surrounding environment of the vehicle 102.

The naturalistic driving application 106 may execute LiDAR logic to create LiDAR data and determine one or more sets of three-dimensional object reflectivity coordinates (sets(s) of object coordinates) (e.g., local coordinates, geographic coordinates (latitude, longitude, ellipsoid height), or geocentric coordinates (x,y,z, coordinates)) based on the reception of one or more reflected laser waves by the LiDAR transceiver(s) 116. More specifically, the vehicle laser projection system 114 may be configured to execute the LiDAR logic to create the LiDAR data that classifies the set(s) of object coordinates from one or more traffic related objects located within the surrounding environment of the vehicle 102. The set(s) of object coordinates may indicate the location (e.g., location with respect to the vehicle), range (distance from the vehicle 102) and position (e.g., direction of the object with respect to the vehicle 102) off which the reflected laser waves were reflected.

In one or more embodiment, the vehicle dynamic sensors 118 may be included as part of a Controller Area network (CAN) of the vehicle 102 and may be configured to provide vehicle dynamic data to the ECU 104, one or more vehicle systems (not shown), and to the naturalistic driving application 106. The vehicle dynamic sensors 118 may include, but may not be limited to, speed sensors, steering speed sensors, steering angle sensors, throttle angle sensors, accelerometers, magnetometers, gyroscopes, brake force sensors, wheel speed sensors, wheel turning angle sensors, yaw rate sensors, transmission gear sensors, temperature sensors, RPM sensors, GPS/DGPS sensors, and the like (individual sensors not shown).

The vehicle dynamic sensors 118 may provide one or more values (e.g., numeric levels) that are associated with the real-time dynamic performance of the vehicle 102 as the driver conducts one or more driving maneuvers and/or as the vehicle 102 is controlled to be autonomously driven. As described below, the naturalistic driving application 106 may utilize the vehicle dynamic data in addition to the image data and the LIDAR data to provide the four layer annotation scheme to build and add annotations and related data to the naturalistic driving behavior data set 126 of the neural network 122.

The navigation system 120 of the vehicle 102 may be utilized to provide turn-by-turn navigation directions to the driver of the vehicle 102 based on an inputted destination (e.g., inputted via navigation system user interface (not shown)). Upon the driver, additional user (e.g., non-driving passenger), or an application (e.g., voice-command input application) utilizing the navigation system 120 to input an intended destination, the navigation system 120 may utilize the memory 108 of the vehicle 102 to store the intended destination. The navigation system 120 may utilize the GPS/DGPS sensors of the vehicle dynamic sensors 118 to determine a current geo-location of the vehicle 102.

The navigation system 120 may additionally utilize map data (not shown) to determine one or more routes to be traveled by the vehicle 102 to reach the intended destination from the current geo-location. The map data may include a geographical map and satellite/aerial imagery of the surrounding environment of the at least one roadway on which the vehicle 102 is traveling during a respective trip of the vehicle 102. In some configurations, the roadway map data may also include road network data, landmark data, aerial view data, street view data, political boundary data, centralized traffic data, centralized infrastructure data, and the like that may be utilized by the navigation system 120, the neural network 122, and/or the application 106 to determine data associated with the surrounding environment of the vehicle 102. As discussed below, the naturalistic driving application 106 may utilize data provided by the navigation system 120 to classify the one or more driving maneuvers as goal-oriented actions that are conducted to follow one or more routes to be traveled by the vehicle 102 to reach the intended destination.

II. The Naturalisitic Driving Application and Related Methods

The components of the naturalistic driving application 106 will now be described according to an exemplary embodiment and with reference to FIG. 1. In an exemplary embodiment, the naturalistic driving application 106 may be stored on the memory 108 and executed by the ECU 104 of the vehicle 102. In another embodiment, the naturalistic driving application 106 may be stored on the externally hosted computing infrastructure and may be accessed by the communication device of the ECU 104 to be executed by the ECU 104 of the vehicle 102.

The general functionality of the naturalistic driving application 106 will now be discussed. In an exemplary embodiment, the naturalistic driving application 106 may include a data reception module 128, a data determinant module 130, a driver action determinant module 132, a driver attention determinant module 134, and a vehicle control module 136. Methods and examples describing process steps that are executed by the modules 128-136 of the naturalistic driving application 106 will now be described in more detail.

Figure 3:
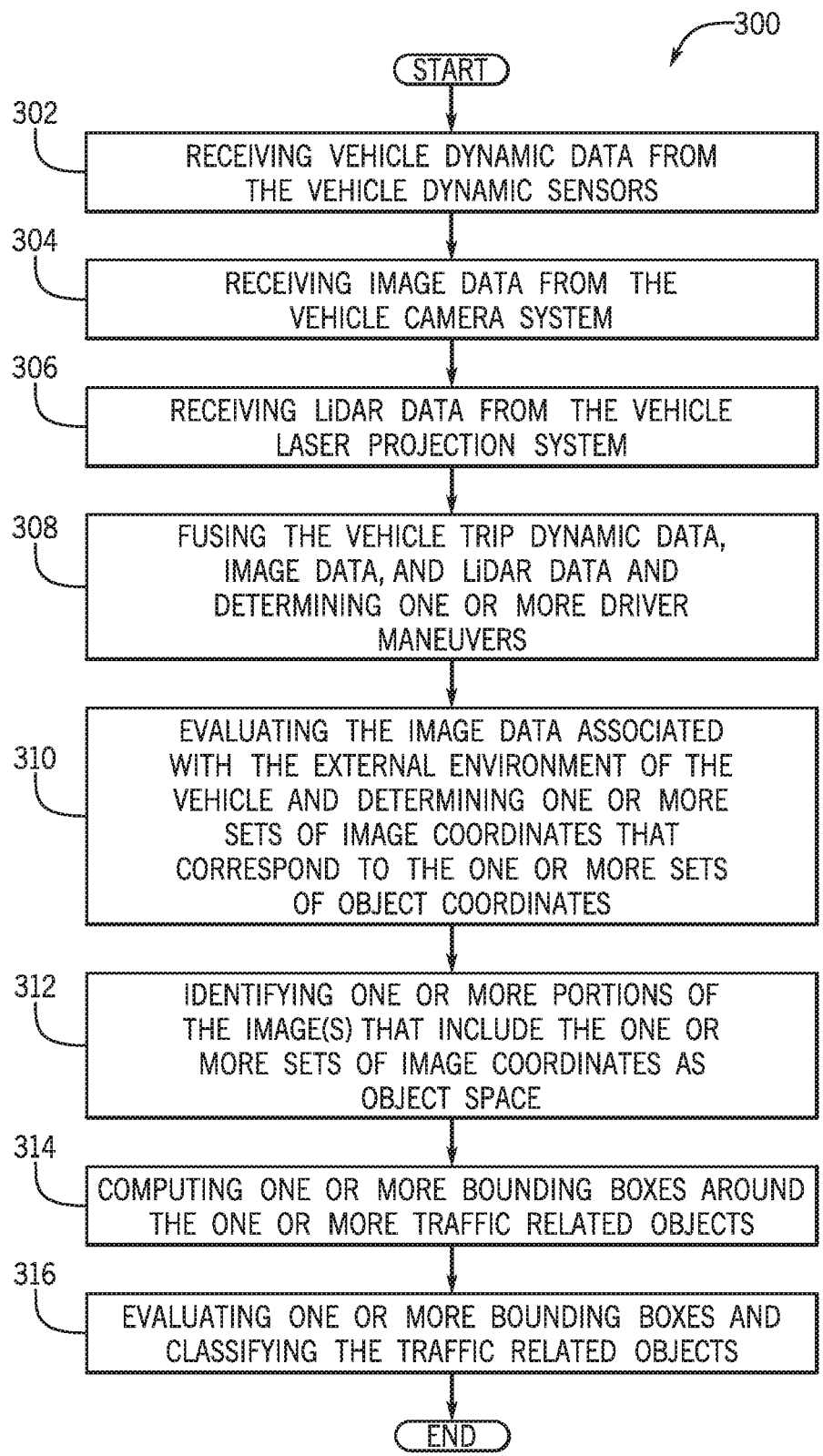
FIG. 3 is a process flow diagram of a method for determining a driver maneuver and classifying one or more traffic related objects according to an exemplary embodiment of the present disclosure.

FIG. 3 is a process flow diagram of a method 300 for determining a driver maneuver and classifying one or more traffic related objects according to an exemplary embodiment of the present disclosure. FIG. 3 will be described with reference to the components of FIG. 1, though it is to be appreciated that the method of FIG. 3 may be used with other systems/components. The method 300 may begin at block 302, wherein the method 300 may include receiving vehicle dynamic data from the vehicle dynamic sensors 118. In an exemplary embodiment, the data reception module 128 of the naturalistic driving application 106 may communicate with the vehicle dynamic sensors 118 of the vehicle 102 to collect the vehicle dynamic data.

In particular, the vehicle dynamic data may include, but may not be limited to, vehicle speed data, steering speed data, steering angle data, throttle angle data, vehicle acceleration data, brake force data, wheel speed data, wheel turning angle data, yaw rate data, transmission gear data, temperature data, RPM data, GPS/DGPS data, and the like. In one embodiment, the data reception module 128 may collect the vehicle dynamic data for each trip of the vehicle 102. The data reception module 128 may package and store the vehicle dynamic data on the memory 108 as a data package (vehicle trip dynamic data) (not shown) that is associated with the respective trip of the vehicle 102. In particular, the vehicle trip dynamic data may be associated with a timeframe of data collection (e.g., a start point/time, end point/time, and duration/timeframe of the respective trip of the vehicle 102), GPS/DPGS coordinates of the vehicle 102 at different instances of the trip of the vehicle 102, and associated map data to be utilized to further classify and annotate the driving maneuvers conducted by the driver of the vehicle 102 during the trip of the vehicle 102.

The method 300 may proceed to block 304, wherein the method 300 may include receiving image data from the vehicle camera system 110. In an exemplary embodiment, the data reception module 128 may communicate with the vehicle camera system 110 to collect untrimmed images/video of the surrounding environment of the vehicle 102 and the internal portions of the vehicle 102. The untrimmed images/video may include a 360 degree external and internal views of the vehicle 102 and surrounding environment of the vehicle 102. In one embodiment, the data reception module 128 may package and store the image data on the memory 108 that is associated with the vehicle trip dynamic data (stored at block 302). The image data may be utilized to further classify and annotate driving maneuvers conducted by the driver of the vehicle 102 during the each trip of the vehicle 102.

The method 300 may proceed to block 306, wherein the method 300 may include receiving LiDAR data from the vehicle laser projection system 114. In an exemplary embodiment, the data reception module 128 may communicate with the vehicle laser projection system 114 to collect LiDAR data that classifies set(s) of object coordinates (e.g., three-dimensional LiDAR object coordinate sets) from one or more traffic related objects located within the surrounding environment of the vehicle 102. The set(s) of object coordinates may indicate the location, range, and positions of the one or more objects off which the reflected laser waves were reflected with respect to a location/position of the vehicle 102. In one embodiment, the data reception module 128 may package and store the LiDAR data on the memory 108 that is associated with the vehicle trip dynamic data (stored at block 302). The LiDAR data may be utilized to further classify and annotate driving maneuvers conducted by the driver of the vehicle 102 during each trip of the vehicle 102.

The method 300 may proceed to block 308, wherein the method 300 may include fusing the vehicle trip dynamic data, image data, and LiDAR data and determining one or more driver maneuvers. In an exemplary embodiment, the data reception module 128 may communicate with the neural network processing unit 124 to provide artificial intelligence capabilities to conduct multimodal fusion for determining one or more driver maneuvers that occur during each trip of the vehicle 102. The data reception module 128 may utilize one or more machine learning/deep learning fusion processes to aggregate the vehicle trip dynamic data, image data, and LiDAR data stored on the memory 108 by the data reception module 128 (at blocks 302, 304, 306). The fused data may be evaluated against stored vehicle dynamic parameters, image recognition parameters, and object recognition parameters that are associated with a plurality of motion patterns of the vehicle 102 stored within the memory 108 and utilized by the neural network 122.

In particular, the neural network processing unit 124 may execute machine learning/deep learning to determine one or more motion patterns from the fused data based on the evaluation of the fused data against the stored dynamic parameters, image recognition parameters, and object recognition parameters. The determination of one or more motion patterns may occur during each trip of the vehicle 102 in which the vehicle trip dynamic data, image data, and LiDAR data is received to determine the one or more driving maneuvers.

In one embodiment, the one or more motion patterns and at least one of the locations, ranges, and positions of one or more traffic related objects, map data, and additional vehicle dynamic data (e.g., steering angle, throttle angle, speed, acceleration, etc.) are evaluated using machine/deep learning techniques, image logic, and LiDAR logic to determine the one or more driving maneuvers (e.g., conducting a left turn, a right turn, braking, accelerating, merging of the vehicle 102, etc.). The data reception module 128 may additionally analyze the image data and determine attributes associated with the one or more driving maneuvers that provide context to the one or more driving maneuvers.

In one configuration, image data and vehicle dynamic information may be further analyzed to determine ego-motion associated with the vehicle 102 to define a more complete motion state of the vehicle 102 during the course of one or more driving maneuvers being conducted. The determination of ego-motion may be used to provide context to the one or more driving maneuvers. In particular, image data associated with the surrounding environment of the vehicle 102, the speed, the steering angle, the throttle angle, the steering speed, the motion, the yaw rate, and the position of the vehicle 102 along with the motion, location, range, and position of one or more surrounding traffic related objects and attributes associated with the travel path of the vehicle 102 (e.g., curbs, lanes) may be analyzed by the data reception module 128.

This analysis may be used to determine ego-motion associated with the vehicle 102 and/or one or more traffic participants located within the surrounding environment of the vehicle 102 to provide context to a particular driving maneuver and further specify details associated with the driving maneuver. For example, upon the determination of the driving maneuver of providing a right turn, the context of the driver maneuver of providing the right turn as a slight right turn to change lanes may be determined as oppose to providing a hard right turn on a roadway based on the determination of ego-motion.

In one embodiment, upon determining the one or more driving maneuvers and context associated with the one or more driving maneuvers, the data reception module 128 may communicate respective data to the driver action determinant module 132. In one embodiment, the driver action determinant module 132 may employ the neural network 122 to learn a representation of a driving state which encodes a history of past measurements stored and retrieved from the memory 108 and translates them into probability distributions. The neural network processing unit 124 may utilize long-short term memory (LSTM) networks (not shown) to perform driver action detection. The driver action determinant module 132 may evaluate the data provided by the data determinant module 130 using the LSTM networks to detect and classify the one or more driving maneuvers as goal-oriented actions by detecting goal-oriented layers or stimulus-driven actions by detecting cause layers.

The method 300 may proceed to block 310, wherein the method 300 may include evaluating the image data associated with the external environment of the vehicle 102 and determining one or more sets of image coordinates that correspond to the one or more sets of object coordinates. In an exemplary embodiment, the data determinant module 130 may communicate with the neural network processing unit 124 to utilize one or more machine learning/deep learning fusion processes and image logic to determine one or more image coordinates associated with traffic related objects located within the surrounding environment of the vehicle 102. As discussed above, such traffic related objects may include, but may not be limited to, traffic participants, roadway attributes, and road side objects. The sets of image coordinates may include two dimensional (x,y) coordinates that represent one or more pixels of the image(s)/video that correspond to the location of one or more objects within the image(s)/video as determined by the neural network processing unit 124.

In one embodiment, upon determining the set(s) of image coordinates, the neural network processing unit 124 may communicate respective data to the data determinant module 130. The data determinant module 130 may further communicate with the neural network processing unit 124 to utilize one or more machine learning/deep learning fusion processes and LiDAR logic to determine one or more sets of object coordinates that may be associated with the one or more traffic related objects. As discussed above, the one or more sets of object coordinates may include one or more sets of three-dimensional coordinates or geocentric coordinates based on the reception of one or more reflected laser waves by the LiDAR transceiver(s) 116.

In one embodiment, upon determining the one or more sets of object coordinates, the neural network processing unit 124 may access the preprogrammed LiDAR coordinates map stored on the memory 108 that may include one or more sets of image coordinates that correspond to one or more sets of object coordinates. The neural network processing unit 124 may utilize the preprogrammed LiDAR coordinates map to determine one or more sets of image coordinates of one or more traffic related objects that correspond to one or more sets of object coordinates of one or more traffic related objects to pin point portions of the image(s)/video that may include the one or more traffic related objects as sensed by the vehicle camera system 110 and the vehicle laser projection system 114. The utilization of the preprogrammed LiDAR coordinates map may ensure that one or more traffic related objects are accounted for that are located within the surrounding environment of the vehicle 102 and that are present within the travel path of the vehicle 102. The neural network processing unit 124 may communicate respective data to the data determinant module 130.

The method 300 may proceed to block 312, wherein the method 300 may include identifying one or more portions of the image(s) that include the one or more sets of image coordinates as object space. In one embodiment, the data determinant module 130 may identify one or more portions of the image(s)/video that represent the one or more sets of image coordinates that correspond to the one or more sets of object coordinates as object space. In other words, the portions of the image(s)/video that correspond to one or more sets of object coordinates of objects that reflect laser beam waves back to the LiDAR transceivers 116 of the vehicle laser projection system 114 are identified as object space.

The method 300 may proceed to block 314, wherein the method 300 may include computing one or more bounding boxes around the one or more traffic related objects. In one embodiment, the data determinant module 130 may compute one or more bounding boxes around the one or more portions of the object space to distinguish the traffic related objects within the object space from other portions of the image(s)/video that do not include the one or more traffic related objects. The data determinant module 130 may additionally compute characteristic data associated with traffic related objects enclosed within the computed bounding boxes as determined by the neural network processing unit 124.

Figure 4A:
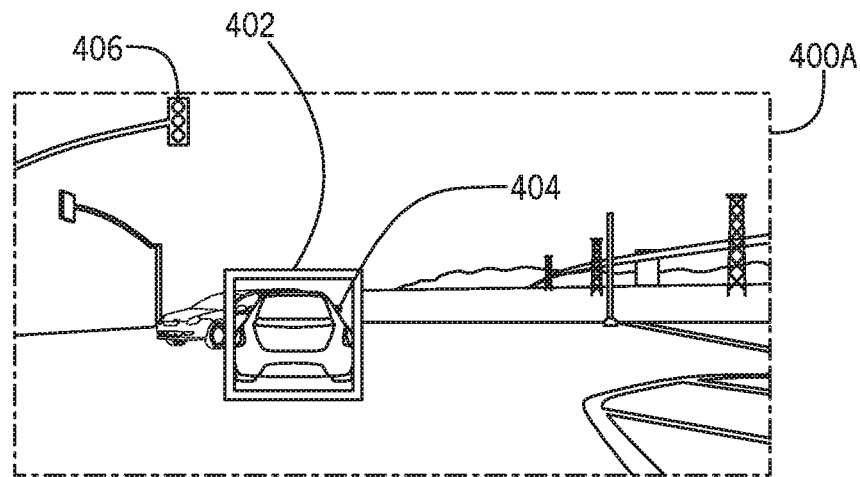
FIG. 4A is an illustrated example of an image of the surrounding environment of the vehicle that includes a bounding box, according to an exemplary embodiment of the present disclosure.
Figure 4B:
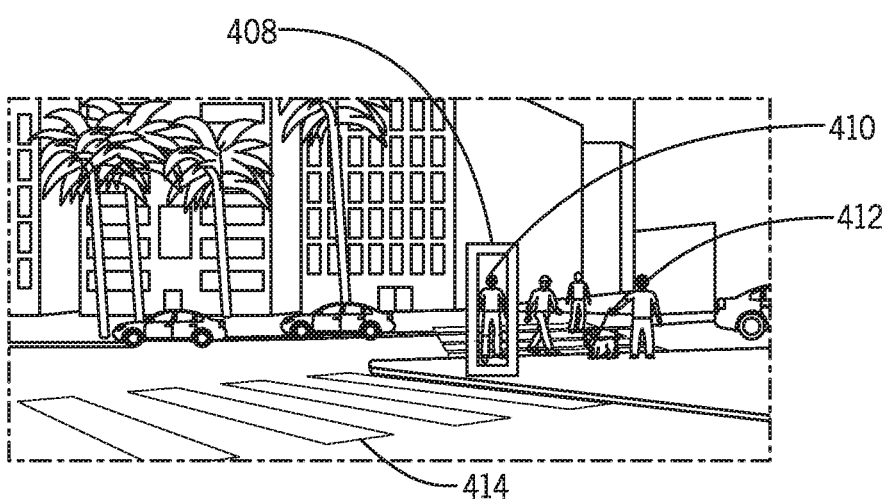
FIG. 4B is an illustrated example of an image of the surrounding environment of the vehicle that includes a bounding box, according to an exemplary embodiment of the present disclosure.

FIG. 4A and FIG. 4B are illustrated examples of images 400A, 400B of the surrounding environment of the vehicle 102 that include bounding boxes 402, 408, according to an exemplary embodiment of the present disclosure. As shown, the images 400A, 400B include traffic related objects 404, 406 that are identified based on one or more sets of image coordinates that correspond to one or more sets of object coordinates. As discussed below, the bounding boxes may be utilized by the application 106 to provide the four layer annotation scheme.

Referring again to the method 300 of FIG. 3, upon computing the one or more bounding boxes around the one or more traffic related objects, the method 300 may proceed to block 316, wherein the method 300 may include evaluating the one or more bounding boxes and classifying the one or more traffic related objects. In one embodiment, the data determinant module 130 may utilize the neural network processing unit 124 to evaluate the traffic related objects enclosed within the one or more computed bounding boxes. The neural network processing unit 124 may scan the portions of image(s)/videos enclosed within the one or more bounding boxes and may compare the one or more traffic related objects found within the one or more bounding boxes against traffic related object models that may be stored within the memory 108 of the vehicle 102 and utilized by the neural network 122. The neural network processing unit 124 may compare the traffic related object(s) found within the one or more bounding boxes and may determine one or more traffic related objects that may be located within a travel path of the vehicle 102 (e.g., part of the roadway, on the roadway, on the side of the roadway) that may influence driving behavior of the driver of the vehicle 102.

In an exemplary embodiment, the neural network processing unit 124 may compare the traffic related object(s) enclosed within the one or more computed bounding boxes against the traffic related object models to categorize one or more objects captured within the image(s) as traffic participants, roadway attributes, or road side objects. In other words, the neural network processing unit 124 may evaluate the image(s) of object(s) (whose existence was determined based on the laser waves reflected back to the LiDAR transceivers 116) against the size and feature values included within traffic related object models and may categorize one of more objects as traffic participants, roadway attributes, or road side objects that may be further analyzed by the neural network 122.

In one or more embodiments, upon categorizing the one or more traffic related objects, the neural network processing unit 124 may utilize the image logic to determine one or more characteristics associated with the one or more traffic related objects. The one or more characteristics may include, but may not be limited to, a type/characteristic of traffic participant (e.g., vehicle, pedestrian), a type/characteristic of roadway attributes (e.g., number of lanes of a roadway, an angle of a curve, a slope of an off-ramp), and a type/characteristic of road side object (e.g., traffic light, traffic light status, road sign, type of road sign). As an illustrative example, with reference to FIG. 4A, the neural network processing unit 124 may categorize the traffic related object 404 as a traffic participant that is further specified as a leading vehicle that has an enabled rear tail brake lights and is decelerating in speed. As discussed below, such data may be utilized to determine a cause of the deceleration of the vehicle 102.

Upon determining one or more characteristics associated with the one or more traffic related objects, the neural network processing unit 124 may communicate respective data to the data determinant module 130. In one embodiment, the data determinant module 130 may communicate data associated to the categorization of the one or more traffic related objects and characteristics of one or more traffic related objects located within the travel path of the vehicle 102 to the driver action determinant module 132 and the driver attention determinant module 134 to be further utilized to provide the four layer annotation scheme.

Figure 5:
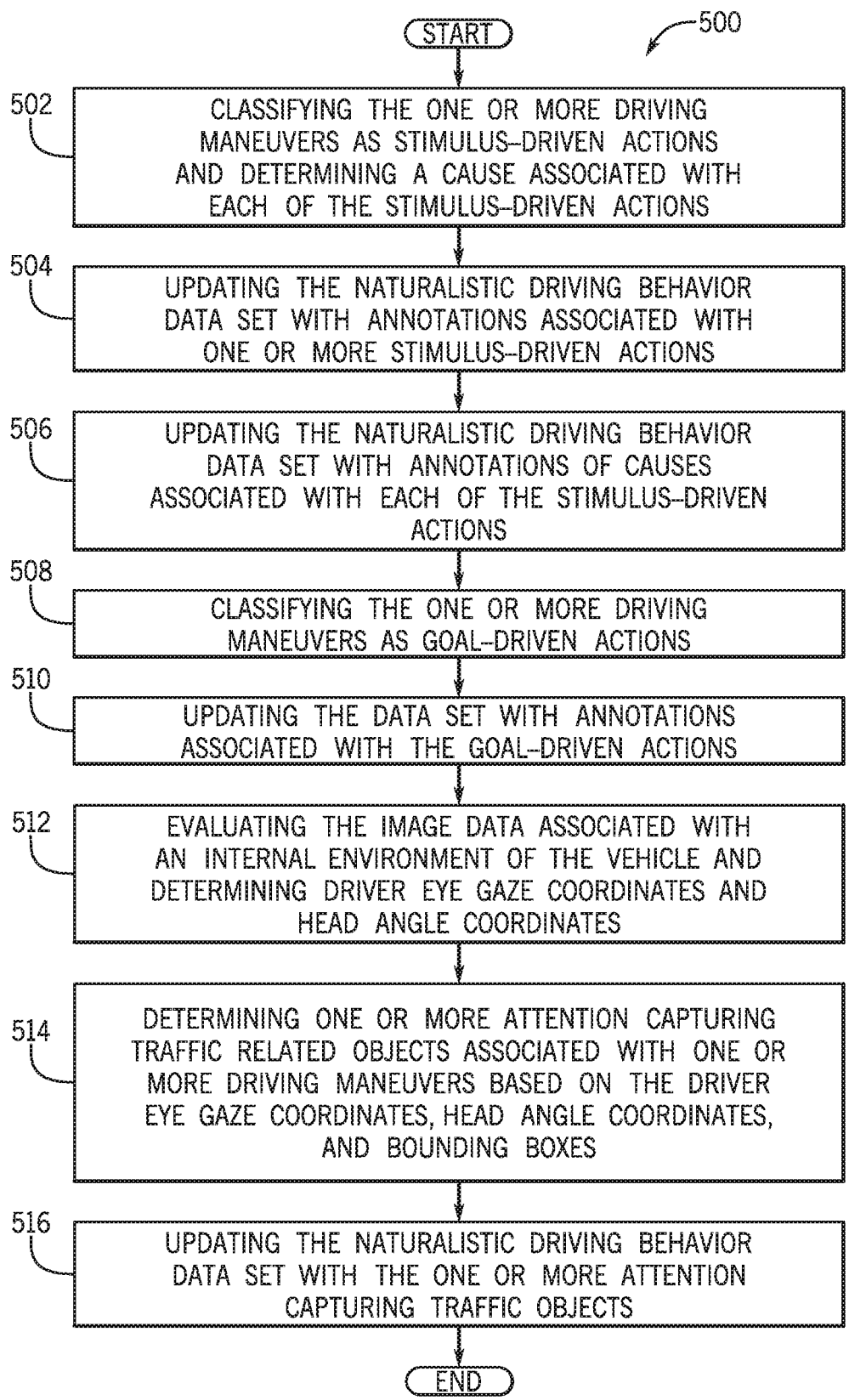
FIG. 5 is a process flow diagram of a method for providing a four layer annotation scheme according to an exemplary embodiment of the present disclosure.

FIG. 5 is a process flow diagram of a method 500 for providing the four layer annotation scheme according to an exemplary embodiment of the present disclosure. FIG. 5 will be described with reference to the components of FIG. 1, though it is to be appreciated that the method of FIG. 5 may be used with other systems/components. The method 500 may begin at block 502, wherein the method 500 may include classifying the one or more driving maneuvers as stimulus-driven actions and determining the cause associated with each of the stimulus-driven actions. In an exemplary embodiment, the driver action determinant module 132 may communicate with the neural network processing unit 124 to evaluate the one or more characteristics associated with the one or more traffic related objects.

In an exemplary embodiment, the driver action determinant module 132 may evaluate the one or more driving maneuvers, the one or more traffic related objects determined to be located within the travel path of the vehicle 102, the classifications and characteristics of the one or more traffic related objects, image data, and vehicle dynamic data to determine a driving scene of the vehicle 102 that is associated with each of the one or more driving maneuvers. The driving scene of the vehicle 102 may include attributes associated with the surrounding environment of the vehicle 102 as a respective driving maneuver is conducted. Additionally, the driving scene may include the classifications, characteristics, locations, ranges, and positions of one or more traffic related objects that are located within the surrounding environment of the vehicle 102 (with respect to the vehicle 102) as the respective driving maneuver is conducted. As an illustrative example, the driving scene may include a traffic light that is flashing red, a curb characterized as being at an turning angle of 30 degrees, a pedestrian characterized as a walking pedestrian, a road sign characterized as a stop sign, and a road marking characterized as a cross-walk that may be included within the surrounding environment of the vehicle 102 at a specific location, position, and range with respect to the vehicle 102.

The driver action determinant module 132 may thereafter evaluate the driving scene to determine the context of one or more driving maneuvers that have been conducted by the driver to determine if the driving maneuver(s) is conducted due to external stimuli that is present within the surrounding environment of the vehicle 102. In particular, the driver action determinant module 132 may evaluate each particular driving maneuver and traffic related object characteristics (e.g., traffic light state, position, location, and range of objects, speed of the vehicle, steering angle, braking force, etc.) to determine external stimuli that is a (partial or full) cause of the driver's driving maneuver. Based on the determination of the external stimuli from the evaluation of the driving scene, the driver action determinant module 132 may classify the driver maneuver as a stimulus-driven action.

With reference to the illustrative example of FIG. 4A, if a driver maneuver is determined as braking of the vehicle 102 to slow down the vehicle 102 based on the presence of the traffic related object 404 categorized as a traffic participant that is further specified as a leading vehicle that has an enabled rear tail brake lights and is decelerating in speed, and a traffic related object 406 categorized as a road side object that is further specified as a traffic light that is presented as red, the driver action determinant module 132 may evaluate the driving scene to determine the context of the driving maneuver as a stopping of the vehicle 102 that is based on one or more possible external stimuli. As discussed below, the one or more possible external stimuli may be determined as one or more causes associated with each of the driving maneuvers classified as stimulus-driven actions.

The method 500 may process to block 504, wherein the method 500 may include updating the naturalistic driving behavior data set 126 with annotations associated with the one or more stimulus-driven actions. In an exemplary embodiment, upon classifying the one or more driving maneuvers as the stimulus-driven actions, the driver action determinant module 132 may communicate with the neural network processing unit 124 to access the naturalistic driving behavior data set 126 stored on the memory 108 of the vehicle 102.

In one configuration, the driver action determinant module 132 may add one or more annotations that describe the one or more driving maneuvers classified as stimulus-driven actions to the naturalistic driving behavior data set 126. The driver action determinant module 132 may additionally add related data associated with the one or more driving maneuvers classified as the stimulus-driven actions. The related data may include, but may not be limited to, vehicle dynamic data, vehicle location data, traffic related object location data, and/or additional image data associated with the stimulus-driven action(s).

In an additional embodiment, the one or more annotations may be manually added to the naturalistic driving behavior data set 126 by a plurality of independent human annotators using open source software (e.g., ELAN[2]) after manual evaluation of image data (e.g., untrimmed videos), vehicle dynamic data, and LiDAR data. The one or more human annotations may be communicated to the neural network 122 through communication between the communication device of the ECU 104 and the externally hosted computing infrastructure. Upon the ECU 104 receiving the one or more annotations, the one or more annotations may be communicated to the neural network 122 to update the naturalistic driving behavior data set 126.

As an illustrative example, the manual annotation scheme may involve the annotation of one or more driving sessions by two independent human annotators using the open source software. A third annotator may merge the annotations provided by the two independent human annotators with his/her own annotations based on his/her own judgment into a single annotation. An expert annotator (e.g., fourth annotator) may thereafter review and obtain a final version of an expert annotation. The final version of the expert annotation may be compared against the signal annotation provided by the third annotator on up to ten different sessions to determine if a threshold percentage of agreement is found between the expert annotations and the annotations provided by the third annotator. Therefore, the manual addition of the one or more annotations may be systematically evaluated to ensure annotation quality before they are communicated to the neural network 122 to update the naturalistic driving behavior data set 126.

Figure 6:
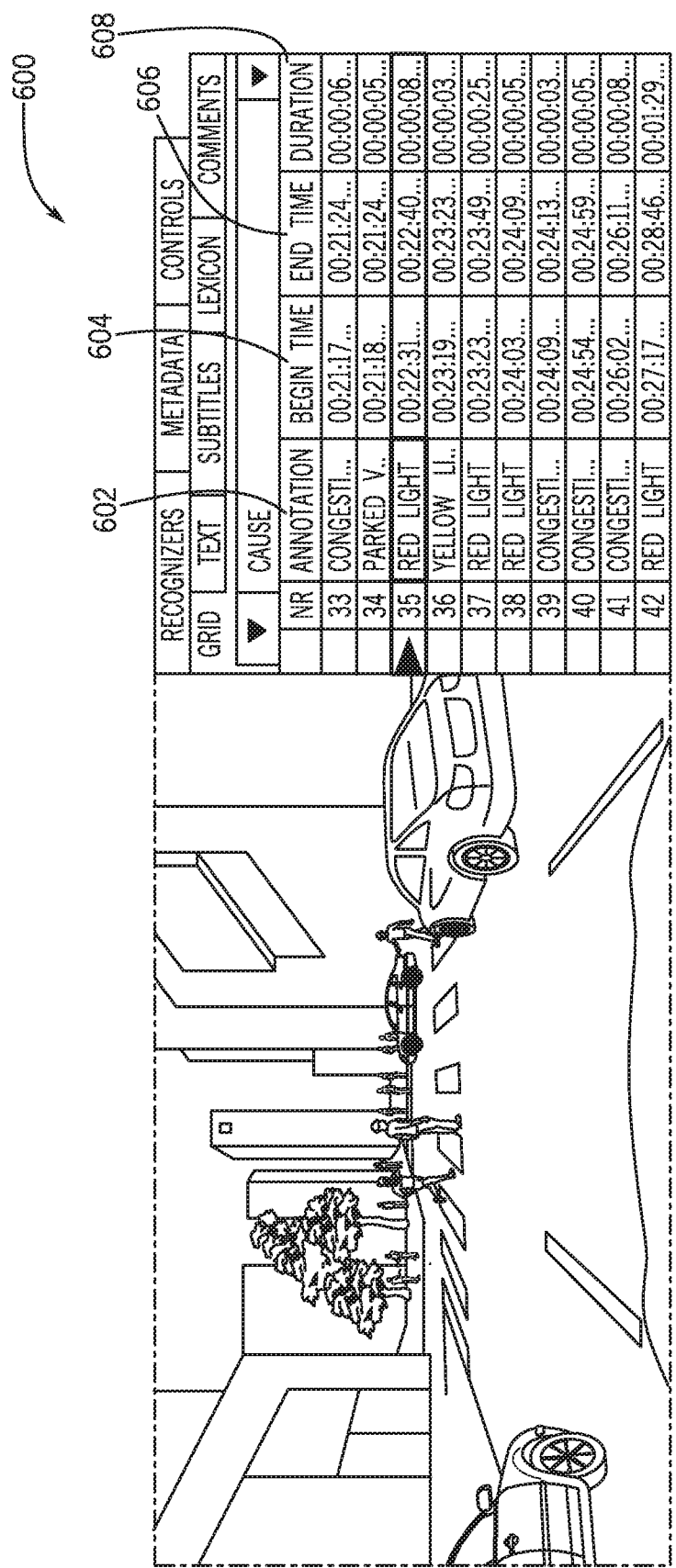
FIG. 6 is an illustrated example of manually adding annotations associated with causes according to an exemplary embodiment of the present disclosure.

As shown in FIG. 6, an illustrated example of manually adding annotations associated with causes, annotations 602 that describe driving related events associated with the surrounding environment of the vehicle 102 may be manually added to the naturalistic driving behavior data set 126. The annotations 602 may be provided for one or more time frames of the vehicle trip and may include one or more events that are recognized based on the utilization of image logic. The annotations 602 may be added manually to include a short description of causes (e.g., external stimuli) that additionally include related data such as a begin time 604, an end time 606, and a duration 608 of each of the annotated causes.

With reference to FIG. 1, in one or more embodiments, the driver action determinant module 132 may evaluate the naturalistic driving behavior data set 126 to determine if one or more annotations that describe the one or more driving maneuvers classified as stimulus-driven actions have been previously added to the data set 126. If it is determined that one or more driving maneuvers classified as stimulus-driven actions have been previously added to the data set 126, the driver action determinant module 132 may annotate a number of instances of each respective driving maneuver classified as a stimulus-driven action that have been classified over a predetermined period of time (e.g., 180 days). Additionally, the driver action determinant module 132 may annotate an average duration of each respective driving maneuver classified as a stimulus-driven action.

As shown in the illustrative example of FIG. 2, the naturalistic driving behavior data set 200 may include annotations associated with respective driving maneuvers classified as the stimulus-driven action 204. Additionally, the naturalistic driving behavior data set 200 may include annotations associated with the number of instances of the stimulus-driven actions and the average duration of the stimulus-driven actions 204. It is to be appreciated that the naturalistic driving behavior data set may be annotated with related data that is associated with the context of one or more driving maneuvers classified as the stimulus-driven actions.

The method 500 may proceed to block 506, wherein the method 500 may include updating the naturalistic driving behavior data set 126 with annotations of causes associated with each of the stimulus-driven actions. The driver action determinant module 132 may evaluate the driving scene to determine the external stimuli that is present within the surrounding environment of the vehicle 102 as the cause of the driving maneuver(s) classified as stimulus-driven action(s). In an exemplary embodiment, upon determining the causal relationship between the external stimuli and the stimulus-driven action(s), the driver action determinant module 132 may communicate with the neural network processing unit 124 to access the naturalistic driving behavior data set 126 stored on the memory 108 of the vehicle 102.

In one embodiment, the driver action determinant module 132 may add one or more annotations that describe one or more causes associated with the stimulus-driven actions to the naturalistic driving behavior data set 126. The one or more annotations may be added with related data that includes an identifier that identifies and links the casual relationship between each cause 206 and each stimulus-driven action 204. Additional related data that may be added to the naturalistic driving behavior data set 126, may include, but may not be limited to data associated with the cause (e.g., type of traffic related object), vehicle location, location, position, and range of traffic related object(s), and/or additional image data associated with the stimulus-driven action(s).

Referring again to the illustrative example of FIG. 4A, if a driver maneuver includes braking of the vehicle 102 to slow down the vehicle 102 based on the presence of the traffic related object 404 categorized as a traffic participant that is further specified as a leading vehicle that has enabled rear tail brake lights and is decelerating in speed, and a traffic related object 406 categorized as a road side object that is further specified as a traffic light that is presented as red, the driver action determinant module 132 may determine the traffic light presented as red and the leading vehicle as causes of the stimulus-driven action of braking of the vehicle 102. The driver action determinant module 132 may additionally add respective annotations and related data to the naturalistic driving behavior data set 126.

In an additional embodiment, the one or more annotations may be manually added to the naturalistic driving behavior data set 126 by a plurality of independent human annotators using open source software after manual evaluation of image data (e.g., untrimmed videos), vehicle dynamic data, and LiDAR data. The one or more human annotations may be communicated to the neural network 122 through communication between the communication device of the ECU 104 and the externally hosted computing infrastructure. Upon the ECU 104 receiving the one or more annotations, the one or more annotations may be communicated to the neural network 122 to update the naturalistic driving behavior data set 126.

With continued reference to FIG. 1, in one or more embodiments, the driver action determinant module 132 may evaluate the naturalistic driving behavior data set 126 to determine if one or more annotations associated with causes of the stimulus-driven action(s) have been previously added to the data set 126. If it is determined that the one or more annotations have been previously added to the data set 126, the driver action determinant module 132 may annotate a number of instances of each respective cause that have been determined over a predetermined period of time (e.g., 180 days). Additionally, the driver action determinant module 132 may annotate an average duration of each respective external stimuli determined to be a cause of each stimulus-driven action.

As shown in the illustrative example of FIG. 2, the naturalistic driving behavior data set 200 may include annotations associated with the cause 206 associated with each of the stimulus-driven actions 204. Additionally, the naturalistic driving behavior data set 200 may include annotations associated with the number of instances of the cause 206 and the average duration of the cause 206. It is to be appreciated that the naturalistic driving behavior data set 126 may additionally be annotated with related data (e.g., location, position, range, characteristics of the cause) and indications that link each cause 206 to a stimulus-driven action 204.

The method 500 may proceed to block 508, wherein the method 500 may include classifying the one or more driving maneuvers as goal-oriented actions. In an exemplary embodiment, the driver action determinant module 132 may evaluate one or more of the one or more driving maneuvers, the one or more traffic related objects determined to be located within the travel path of the vehicle 102, the classifications and characteristics of the one or more traffic related objects, and image data, and vehicle dynamic data to determine a driving scene of the vehicle 102 that is associated with each of the one or more driving maneuvers. The driving scene of the vehicle 102 may include attributes associated with the surrounding environment of the vehicle 102 as a respective driving maneuver is conducted.

The driver action determinant module 132 may additionally communicate with the navigation system 120 of the vehicle 102 to determine if the navigation system 120 is utilized to provide navigable directions to an intended destination. If it is determined that the navigation system 120 is utilized to provide navigable directions to an intended destination, the driver action determinant module 132 may further communicate with the vehicle dynamic sensors 118 to determine a current GPS/DGPS location of the vehicle 102. The driver action determinant module 132 may additionally access map data to determine one or more traveling paths the vehicle 102 may follow to reach the intended destination.

The driver action determinant module 132 may thereafter evaluate the driving scene to determine the context of one or more driving maneuvers that have been conducted by the driver to determine if the driving maneuver(s) is conducted absent of an external stimuli that is present within the surrounding environment of the vehicle 102. In particular, the driver action determinant module 132 may evaluate each particular driving maneuver, the context of the driving maneuver, traffic related object characteristics (e.g., traffic light state, position of objects), and navigation system data to determine that the driver may have intended to make the driving maneuver(s) independent of any external stimuli (e.g., associated with one or more traffic related objects).

Based on this evaluation, the driver action determinant module 132 may classify the driver maneuver(s) as a goal-oriented action(s). As an illustrative example, if a driver maneuver includes taking a right turn to follow a navigation travel path output by the navigation system 120 to an intended destination, the driver action determinant module 132 may evaluate the driving scene and the navigation system data to determine the context as right turn of the vehicle 102 based an intention to follow the travel path to the intended destination. The driver action determinant module 132 may classify the right turn as a goal-oriented action.

The method 500 may proceed to block 510, wherein the method 500 may include updating the naturalistic driving behavior data set with annotations associated with one or more goal-oriented actions. In an exemplary embodiment, upon classifying the one or more driving maneuvers as the goal-oriented actions, the driver action determinant module 132 may communicate with the neural network processing unit 124 to access the naturalistic driving behavior data set 126 stored on the memory 108 of the vehicle 102. In one embodiment, the driver action determinant module 132 may add one or more annotations that describe the one or more driving maneuvers as goal-oriented actions to the naturalistic driving behavior data set 126. The driver action determinant module 132 may additionally add related data associated with the one or more driving maneuvers classified as the goal-oriented actions. The related data may include, but may not be limited to, vehicle dynamic data, navigation data, vehicle location data, traffic related object location data, and/or additional image data associated with the goal-oriented action(s).

In an additional embodiment, the one or more annotations may be manually added to the naturalistic driving behavior data set 126 by a plurality of independent human annotators using open source software (e.g., ELAN[2]) after manual evaluation of image data (e.g., untrimmed videos), vehicle dynamic data, and LiDAR data. The one or more human annotations may be communicated to the neural network 122 through communication between the communication device of the ECU 104 and the externally hosted computing infrastructure. Upon the ECU 104 receiving the one or more annotations, the one or more annotations may be communicated to the neural network 122 to update the naturalistic driving behavior data set 126.

In one or more embodiments, the driver action determinant module 132 may evaluate the naturalistic driving behavior data set 126 to determine if one or more annotations that describe the one or more driving maneuvers classified as goal-oriented actions have been previously added to the data set 126. If it is determined that one or more driving maneuvers classified as goal-oriented actions have been previously added to the data set 126, the driver action determinant module 132 may annotate a number of instances of each respective driving maneuver classified as a goal-oriented action that have been classified over a predetermined period of time (e.g., 180 days). Additionally, the driver action determinant module 132 may annotate an average duration of each respective driving maneuver classified as a goal-oriented action.

As shown in the illustrative example of FIG. 2, the naturalistic driving behavior data set 200 may include annotations associated with respective driving maneuvers classified as the goal-oriented action 202. Additionally, the naturalistic driving behavior data set 200 may include annotations associated with the number of instances of the goal-oriented actions and the average duration of the goal-oriented actions 202 that have been classified over a predetermined period of time. It is to be appreciated that the naturalistic driving behavior data set 126 may be annotated with related data that is associated with the context of one or more driving maneuvers classified as the goal-oriented actions.

The method 500 may proceed to block 512, wherein the method 500 may include evaluating the image data associated with an internal environment of the vehicle 102 and determining driver eye gaze coordinates and head angle coordinates. In an exemplary embodiment, the driver attention determinant module 134 may communicate with the neural network processing unit 124 may communicate with the neural network processing unit 124 to utilize one or more machine learning/deep learning fusion processes and image logic to determine one or more sets of image coordinates associated with the eye gaze movement and head angle movement of the driver of the vehicle 102 as the driver conducts one or more driving maneuvers. The one or more sets of image coordinates may include three dimensional (x,y) coordinates that correspond to direction of the driver's eye gaze and the angle of the driver's head as oppose to a one or more portions of the internal environment of the vehicle 102 (e.g., dashboard).

In one embodiment, upon determining the one or more sets of image coordinates, the neural network processing unit 124 may communicate respective data to the driver attention determinant module 134. In one embodiment, upon determining one or more sets of image coordinates, the neural network processing unit 124 may access the memory 108 to retrieve the preprogrammed driver coordinates map that may include one or more sets of image coordinates that correspond to one or more directions of eye gaze and one or more angles of head movement. The neural network processing unit 124 may utilize the preprogrammed driver coordinates map to output respective eye gaze coordinates and head angle coordinates that may be communicated to the driver attention determinant module 134.

The method 500 may proceed to block 514, wherein the method 500 may include determining one or more attention capturing traffic related objects associated with one or more driving maneuvers based on the driver eye gaze coordinates, head angle coordinates, and bounding boxes. In one embodiment, the driver attention determinant module 134 may utilize the neural network processing unit 124 to evaluate the traffic related objects enclosed within the computed bounding boxes (computed at block 314 of the method 300). The neural network processing unit 124 may scan the portions of image(s)/videos enclosed within the one or more bounding boxes and may compare the one or more traffic related objects found within the one or more bounding boxes against traffic related object models that may be stored within the memory 108 of the vehicle 102 and utilized by the neural network 122.

The neural network processing unit 124 may determine one or more traffic related objects that may be located within a travel path of the vehicle 102 (e.g., part of the roadway, on the roadway, on the side of the roadway) that may influence driving behavior of the driver of the vehicle 102. The neural network processing unit 124 may thereafter determine three dimensional positional coordinates associated with the one or more traffic related objects enclosed within the computed bounding boxes based on object coordinates (as determined from LiDAR data) associated with the one or more traffic related objects.

Upon determining the three dimensional positional coordinates, the driver attention determinant module 134 may utilize the neural network processing unit 124 to evaluate and compare the three dimensional positional coordinates, the driver eye gaze coordinates, and head angle coordinates to determine if the driver attends to (e.g., is aware of) the traffic related object(s) located within the travel path of the vehicle 102 as the driver conducts one or more driving maneuvers (that may influence driving behavior). In other words, the one or more bounding boxes are computed and utilized to determine if the driver attends to the traffic related object(s) enclosed in the one or more bounding boxes based on if the driver's eye gaze and head movement are corresponding to the position of the one or more traffic related object(s) with respect to the vehicle 102.

As shown in the illustrative example of FIG. 4B, three dimensional positional coordinates of the traffic related object 410 that is enclosed in the computed bounding box 408 and is classified as a traffic participant and characterized as a pedestrian may be evaluated and compared with the driver eye gaze coordinates and head angle coordinates to determine if the traffic related object 410 is attended to by the driver of the vehicle 102. Three dimensional positional coordinates of additional traffic related objects such as additional traffic participants 412 characterized as pedestrians, and a roadway attribute 414 characterized as a crosswalk may also be determined and compared against the driver eye gaze coordinates and head angle coordinates to determine if the driver attends to the traffic related objects classified as the traffic participant 412 and the roadway attribute 414 that may affect the driver's driving behavior while conducting a driving maneuver.

The method 500 may proceed to block 516, wherein the method 500 may include updating the naturalistic driving behavior data set 126 with the one or more attention capturing traffic related objects. In an exemplary embodiment, upon determining the one or more attention capturing traffic related objects associated with one or more driving maneuvers, the driver attention determinant module 134 may communicate with the neural network processing unit 124 to access the naturalistic driving behavior data set 126 stored on the memory 108 of the vehicle 102. In one embodiment, the driver attention determinant module 134 may add related data associated with one or more attention capturing traffic related objects to the naturalistic driving behavior data set 126 that may include, but may not be limited to, characteristics of each of the attention capturing traffic related objects, position, range, and location of each of the attention capturing traffic related objects, vehicle dynamic data, image data, and the like.

In an additional embodiment, the one or more annotations may be manually added to the naturalistic driving behavior data set 126 by a plurality of independent human annotators using open source software (e.g., ELAN$^2$) after manual evaluation of image data (e.g., untrimmed videos), vehicle dynamic data, and LiDAR data. The one or more human annotations may be communicated to the neural network 122 through communication between the communication device of the ECU 104 and the externally hosted computing infrastructure. Upon the ECU 104 receiving the one or more annotations, the one or more annotations may be communicated to the neural network 122 to update the naturalistic driving behavior data set 126.

In one or more embodiments, the driver attention determinant module 134 may evaluate the naturalistic driving behavior data set 126 to determine if one or more annotations that describe the one or more attention capturing traffic related objects have been previously added to the data set 126. If it is determined that one or more attention capturing traffic related objects have been previously added to the data set 126, the driver attention determinant module 134 may annotate a number of instances of each respective driving maneuver classified as a goal-oriented action that have been determined over a predetermined period of time (e.g., 180 days). Additionally, the driver attention determinant module 134 may annotate an average duration of time each respective attention capturing traffic related objects may capture the attention of the driver.

As shown in the illustrative example of FIG. 2, the naturalistic driving behavior data set 200 may include annotations associated with each respective attention capturing traffic related objects as an attention capturing traffic related object(s) (shown as attention). Additionally, the naturalistic driving behavior data set 200 may include of each respective driving maneuver classified as a goal-oriented action. The driver attention determinant module 134 may annotate an average duration of time with respect to each respective attention capturing traffic related object that may capture the attention of the driver. It is to be appreciated that the naturalistic driving behavior data set 126 may be annotated with related data that is associated with the context of each respective driving maneuver classified as a goal-oriented action. For example, the naturalistic driving behavior data set 126 may be annotated with additional information that includes the respective positions/locations of each respective attention capturing traffic related objects with respect to the vehicle 102.

Figure 7:
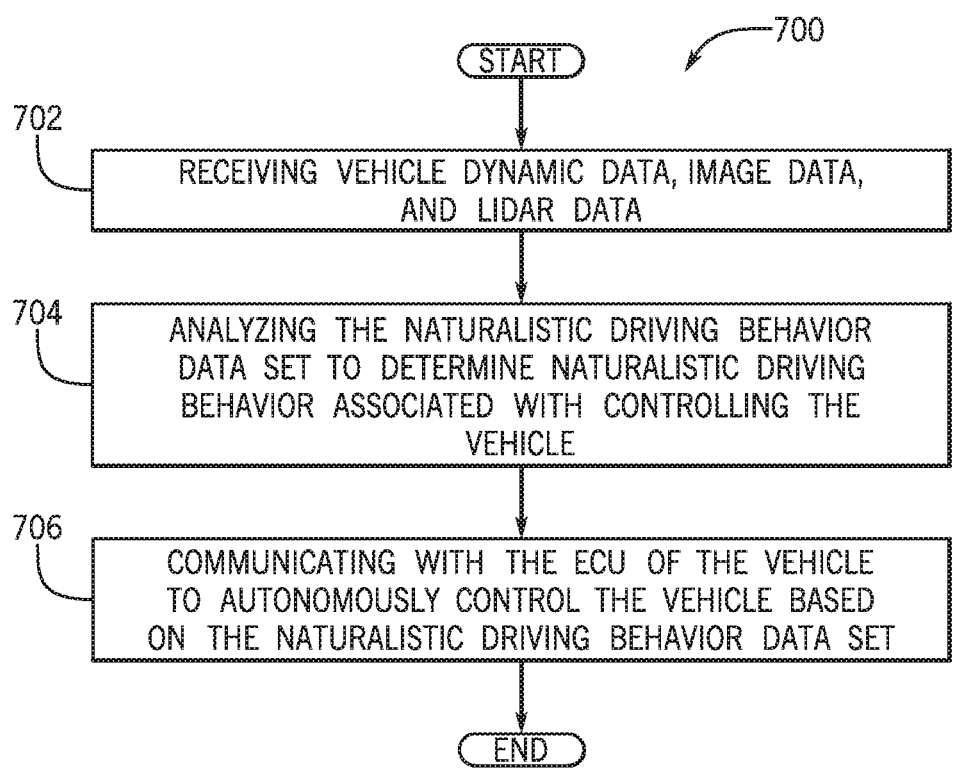
FIG. 7 is a process flow diagram of a method for controlling the vehicle to be autonomously driven based on the naturalistic driving behavior data set according to an exemplary embodiment of the present disclosure.

FIG. 7 is a process flow diagram of a method 700 for controlling the vehicle 102 to be autonomously driven based on the naturalistic driving behavior data set 126 according to an exemplary embodiment of the present disclosure. FIG. 7 will be described with reference to the components of FIG. 1, though it is to be appreciated that the method of FIG. 7 may be used with other systems/components. The method 700 may begin at block 702, wherein the method 700 may include receiving vehicle dynamic data, image data, and LiDAR data.

In an exemplary embodiment, if the vehicle 102 is set to be partially or fully autonomously driven (e.g., by the driver of the vehicle 102 actuating one or more safety features, an occupant actuating full autonomous driving control of the vehicle 102, and/or by the ECU 104), the ECU 104 may communicate with the vehicle dynamic sensors 118, the vehicle camera system 110, and the vehicle laser projection system 114 to receive the vehicle dynamic data, image data, and LiDAR data. Upon receiving the vehicle dynamic data, image data, and LiDAR data, the ECU 104 may communicate the respective data to the vehicle control module 136 of the naturalistic driving application 106. In one embodiment, the vehicle control module 136 may process the vehicle dynamic data to determine vehicle speed data, steering speed data, steering angle data, throttle angle data, vehicle acceleration data, brake force data, wheel speed data, wheel turning angle data, yaw rate data, transmission gear data, temperature data, RPM data, GPS/DGPS data, and the like that is applicable to the current operation of the vehicle 102.

The vehicle control module 136 may additionally process the image data, LiDAR data, and may compute one or more bounding boxes, as described above, to determine image coordinates and object coordinates associated with one or more traffic related objects (e.g., that may include obstacles) that may be located within the travel path of the vehicle 102. The image coordinate and LiDAR coordinates may be further utilized to determine the location, range, and position of the one or more traffic related objects with respect to the current location of the vehicle 102 and the travel path of the vehicle 102. The vehicle control module 136 may analyze the vehicle dynamic data, and image data, and LiDAR data and/or fused data (as determined at block 308) to determine one or more driving scene scenarios and the one or more traffic related objects that may affect the operation of the vehicle 102 when traveling within the surrounding environment of the vehicle 102.

The method 700 may proceed to block 704, wherein the method 700 may include analyzing the naturalistic driving behavior data set to determine naturalistic driving behavior associated with controlling the vehicle 102. In an exemplary embodiment, upon determining the one or more driving scene scenarios and the one or more traffic related objects that may affect the operation of the vehicle 102 when traveling within the surrounding environment of the vehicle 102, the vehicle control module 136 may communicate with the neural network 122 to determine naturalistic driving behavior associated with controlling the vehicle 102 with respect to the one or more driving scene scenarios and the one or more traffic related objects.

In particular, the vehicle control module 136 may communicate with the neural network 122 to analyze data provided by the navigation system 120 associated with an intended destination of the vehicle 102, the one or more driving scene scenarios, and the one or more traffic related objects to predict one or more possible driving maneuvers that may be utilized to safely navigate the vehicle 102. Upon predicting the one or more possible driving maneuvers, the vehicle control module 136 may communicate with the neural network processing unit 124 to access the naturalistic driving behavior data set 126 and to utilize machine learning/deep learning to predict one or more events associated with one or more possible driving maneuvers based on the one or more driving scene scenarios and the one or more traffic related objects.

In one embodiment, the neural network processing unit may utilize the CNN and sensor data to encode each video/image frame provided by the vehicle camera system 110 by extracting convolutional features (e.g., features extracted from shallow, medium, and deep layers) using an InceptionResnet-C2 network (e.g., hybrid deep learning network) and may pool them using a fixed-length vector. Sensor data may also be fused (as discussed above) to the image data and such data may be fed to the LSTM to predict a behavior label. The neural network processing unit 124 may predict that the operation of the vehicle 102 may require one or more driving maneuvers.

Upon the prediction of the one or more driving maneuvers, the neural network processing unit 124 may query the naturalistic driving behavior data set 126 with data representing each of the events and the driving maneuvers to retrieve annotations and additional data associated with the goal-oriented action and/or the stimulus-driven action. The neural network processing unit 124 may additionally query the naturalistic driving behavior data set 126 based on one or more traffic related objects that are determined (at block 702) to retrieve one or more annotations and related data associated with one or more attention capturing traffic related objects.

Additionally, the neural network processing unit 124 may query the naturalistic driving behavior data set based on one or more traffic related objects that are determined (at block 702) to retrieve annotations and additional data associated with one or more causes related to the one or more driving maneuvers classified as the stimulus-driven actions. Upon retrieving the one or more annotations and related data from the naturalistic driving behavior data set 126, the neural network processing unit 124 may communicate the one or more annotations and related data associated with the four-layer annotation scheme to the vehicle control module 136.

The method 700 may proceed to block 706, wherein the method 700 may include communicating with the ECU 104 of the vehicle 102 to autonomously control the vehicle 102 based on the naturalistic driving behavior data set. In an exemplary embodiment, upon receiving the annotations and related data associated with the four-layer annotation scheme, the vehicle control module 136 may analyze the data (e.g., annotations, related data, duration associated with each annotation, number of instances associated with each annotation) and may determine one or more driver behavior models that include one or more discrete actions that may be conducted to autonomously control the vehicle 102 utilizing naturalistic driving behavior.

The vehicle control module 136 may thereby communicate with the ECU 104 of the vehicle 102 to autonomously control the vehicle 102 to be driven based on the one or more driver behavior models that include the one or more discrete actions to implement naturalistic driving behaviors in various driving scenes and circumstances. The ECU 104 may communicate with one or more of the control units of the vehicle 102 to thereby control the vehicle 102 to be driven autonomously based on the naturalistic driving behavior data set 126 to control the vehicle 102 to execute naturalistic driving behavior with a high level of driving scene understanding.

As an illustrative example, the vehicle control module 136 may utilize one or more annotations and additional data to determine one or more driver behavior models that may include one or more discrete actions that may be conducted by the vehicle 102 to account for congestion, a crossing vehicle, a merging vehicle, a cross-walk, and a traffic light that may be located within the travel path of the vehicle 102. More specifically, the one or more driver behavior models that include one or more discrete actions associated with stimulus-driven actions that may be conducted in a particular manner(s) (e.g., with the application of a particular speed, acceleration, steering angle, throttle angle, braking force, etc.) to account for one or more causes and one or more attention-capturing traffic related objects to provide naturalistic driving behaviors based on the four layer annotation scheme of the naturalistic driving behavior data set 126. For instance, with respect to the illustrative example discussed, the vehicle 102 may be autonomously controlled to slow down (stimulus-driven action) and stop (stimulus-driven action) using a specific braking force (stimulus-driven action) based on traffic congestion (cause), the crossing vehicle (cause), the merging vehicle (cause) and the cross-walk (attention capturing traffic related object) located within the travel path of the vehicle 102 that may be autonomously conducted by the application 106.

Figure 8:
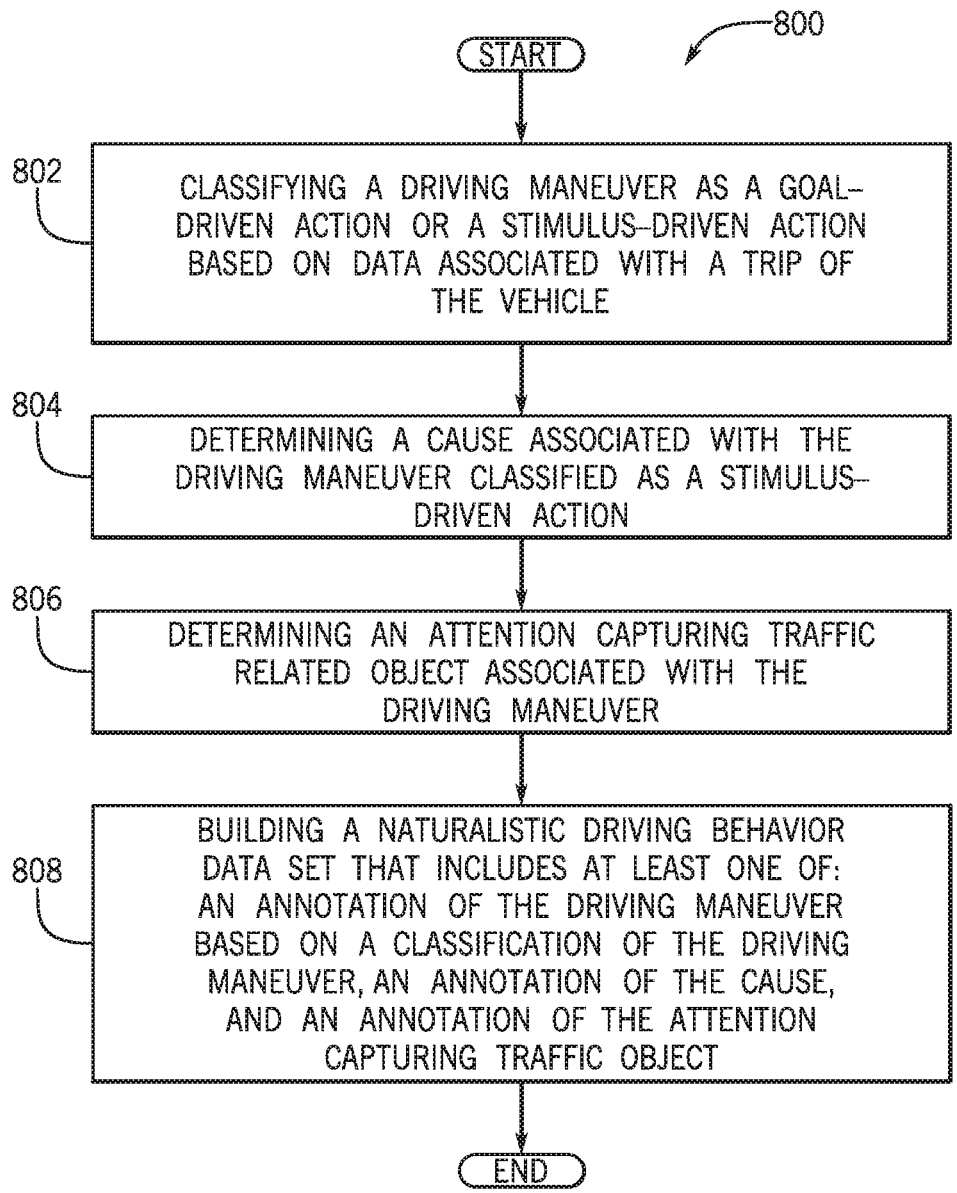
FIG. 8 is a process flow diagram of a method for learning and executing naturalistic driving behavior according to an exemplary embodiment of the present disclosure.

FIG. 8 is a process flow diagram of a method 800 for learning and executing naturalistic driving behavior according to an exemplary embodiment of the present disclosure. FIG. 8 will be described with reference to the components of FIG. 1, though it is to be appreciated that the method of FIG. 8 may be used with other systems/components. The method 800 may begin at block 802, wherein the method 800 may include classifying a driving maneuver as a goal-oriented action or a stimulus-driven action based on data associated with driving of the vehicle 102 during a trip of the vehicle 102.

The method 800 may proceed to block 804, wherein the method 800 may include determining a cause associated with the driving maneuver classified as a stimulus-driven action. The method 800 may proceed to block 806, wherein the method 800 may include determining an attention capturing traffic related object associated with the driving maneuver.

The method 800 may proceed to block 808, wherein the method includes building a naturalistic driving behavior data set 126. The method 800 may proceed to block 810, wherein the method 800 may include controlling the vehicle 102 to be autonomously driven based on the naturalistic driving behavior data set 126.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for learning and executing naturalistic driving behavior, comprising:

classifying a driving maneuver as a goal-oriented action or a stimulus-driven action based on data associated with a trip of a vehicle, wherein the classification is based on an evaluation of a driving scene to determine the presence of an external stimuli as a cause of the driving maneuver, and wherein the driving maneuver is classified as goal-oriented if the driving maneuver is conducted absent of external stimuli and the driving maneuver is classified as stimulus-driven upon determining that the driving maneuver is conducted due to the external stimuli;

determining an attention capturing traffic related object associated with the driving maneuver based on an average duration of time the attention capturing traffic related object captures the attention of a driver of the vehicle;

building a naturalistic driving behavior data set that includes at least one of an annotation of the driving maneuver based on a classification of the driving maneuver, an annotation of the cause, and an annotation of the attention capturing traffic object; and controlling the vehicle to be autonomously driven based on the naturalistic driving behavior data set, wherein annotations included within the naturalistic driving behavior data set are utilized to control the vehicle to execute the naturalistic driving behavior.

2. The computer-implemented method of claim 1, further including determining the driving maneuver, wherein at least one motion pattern associated with the vehicle and at least one of: a location, a range, and a position of at least one traffic related object, map data, and vehicle dynamic data are evaluated to determine the driving maneuver.

3. The computer-implemented method of claim 2, wherein image data and LiDAR data are evaluated to determine at least one portion of at least one image that includes at least one set of image coordinates that correspond to at least one set of object coordinates to identify at least one portion of the at least one image as object space.

4. The computer-implemented method of claim 3, wherein a bounding box is computed within the object space to enclose at least one traffic related object, wherein the at least one traffic related object enclosed by the bounding box is compared against traffic related object models to categorize the at least one traffic related object as a traffic participant, a roadway attribute, or a road side object.

5. The computer-implemented method of claim 4, wherein at least one characteristic is determined that is associated with the at least one traffic related object enclosed by the bounding box, wherein a category and the at least one characteristic of the at least one traffic related object enclosed by the bounding box, image data, and vehicle dynamic data is evaluated to determine a driving scene of the vehicle that is associated with the driving maneuver.

6. The computer-implemented method of claim 1, wherein determining the attention capturing traffic related object associated with the driving maneuver further includes evaluating the at least one traffic related object enclosed within the bounding box and determining three-dimensional coordinates associated with the at least one traffic related object, wherein the three-dimensional coordinates associated with the at least one traffic related object are compared to driver eye gaze coordinates and head angle coordinates to determine if the at least one traffic related object is the attention capturing traffic related object that is attended to during the driving maneuver.

7. A system for learning and executing naturalistic driving behavior, comprising:
a memory storing instructions when executed by a processor cause the processor to:
classify a driving maneuver as a goal-oriented action or a stimulus-driven action based on data associated with a trip of a vehicle, wherein the classification is based on an evaluation of a driving scene to determine the presence of an external stimuli as a cause of the driving maneuver, and wherein the driving maneuver is classified as goal-oriented if the driving maneuver is conducted absent of external stimuli and the driving maneuver is classified as stimulus-driven upon determining that the driving maneuver is conducted due to the external stimuli;
determine an attention capturing traffic related object associated with the driving maneuver based on an average duration of time the attention capturing traffic related object captures the attention of a driver of the vehicle;
build a naturalistic driving behavior data set that includes at least one of an annotation of the driving maneuver based on a classification of the driving maneuver, an annotation of the cause, and an annotation of the attention capturing traffic object; and
control the vehicle to be autonomously driven based on the naturalistic driving behavior data set, wherein annotations included within the naturalistic driving behavior data set are utilized to control the vehicle to execute the naturalistic driving behavior.

8. The system of claim 7, further including determining the driving maneuver, wherein at least one motion pattern associated with the vehicle and at least one of: a location, a range, and a position of at least one traffic related object, map data, and vehicle dynamic data are evaluated to determine the driving maneuver.

9. The system of claim 8, wherein image data and LiDAR data are evaluated to determine at least one portion of at least one image that includes at least one set of image coordinates that correspond to at least one set of object coordinates to identify at least one portion of the at least one image as object space.

10. The system of claim 9, wherein a bounding box is computed within the object space to enclose at least one traffic related object, wherein the at least one traffic related object enclosed by the bounding box is compared against traffic related object models to categorize the at least one traffic related object as a traffic participant, a roadway attribute, or a road side object.

11. The system of claim 10, wherein at least one characteristic is determined that is associated with the at least one traffic related object enclosed by the bounding box, wherein a category and the at least one characteristic of the at least one traffic related object enclosed by the bounding box, image data, and vehicle dynamic data is evaluated to determine a driving scene of the vehicle that is associated with the driving maneuver.

12. The system of claim 7, wherein determining the attention capturing traffic related object associated with the driving maneuver includes evaluating the at least one traffic related object enclosed within the bounding box and determining three-dimensional coordinates associated with the at least one traffic related object, wherein the three-dimensional coordinates associated with the at least one traffic related object are compared to driver eye gaze coordinates and head angle coordinates to determine if the at least one traffic related object is the attention capturing traffic related object that is attended to during the driving maneuver.

13. A non-transitory computer readable storage medium storing instructions that when executed by a computer, which includes a processor perform a method, the method comprising:
classifying a driving maneuver as a goal-oriented action or a stimulus-driven action based on data associated with a trip of a vehicle, wherein the classification is based on an evaluation of a driving scene to determine the presence of an external stimuli as a cause of the driving maneuver, and wherein the driving maneuver is classified as goal-oriented if the driving maneuver is conducted absent of external stimuli and the driving maneuver is classified as stimulus-driven upon determining that the driving maneuver is conducted due to the external stimuli;
determining an attention capturing traffic related object associated with the driving maneuver based on an average duration of time the attention capturing traffic related object captures the attention of a driver of the vehicle;
building a naturalistic driving behavior data set that includes an annotation of the driving maneuver based on a classification of the driving maneuver, an annotation of the cause, and an annotation of the attention capturing traffic object; and
controlling the vehicle to be autonomously driven based on the naturalistic driving behavior data set, wherein annotations included within the naturalistic driving behavior data set are utilized to control the vehicle to execute naturalistic driving behavior.

14. The non-transitory computer readable storage medium of claim 13, wherein at least one motion pattern associated with the vehicle and at least one of: a location, a range, and a position of at least one traffic related object, map data, and vehicle dynamic data are evaluated to determine the driving maneuver.

* * * * *